US012680677B1

(12) United States Patent
Wang

(10) Patent No.: US 12,680,677 B1
(45) Date of Patent: Jul. 14, 2026

(54) LED DISPLAY UNIT WITH ANGULARLY ADJUSTABLE CONNECTING STRUCTURE

(71) Applicant: Shenzhen Kingly LED Co., Ltd., Shenzhen (CN)

(72) Inventor: Lijin Wang, Shenzhen (CN)

(73) Assignee: Shenzhen Kingly LED Co., Ltd., Shenzhen (CN)

( * ) Notice: Subject to any disclaimer, the term of this patent is extended or adjusted under 35 U.S.C. 154(b) by 0 days.

(21) Appl. No.: 19/342,980

(22) Filed: Sep. 29, 2025

(30) Foreign Application Priority Data

Nov. 20, 2024 (CN) ......................... 202411659270.3

(51) Int. Cl.

| | |
|---|---|
| ***F21V 19/00*** | (2006.01) |
| ***F21V 23/06*** | (2006.01) |
| *F21Y 103/10* | (2016.01) |
| *F21Y 115/10* | (2016.01) |

(52) U.S. Cl.
CPC .......... *F21V 19/0055* (2013.01); *F21V 23/06* (2013.01); *F21Y 2103/10* (2016.08); *F21Y 2115/10* (2016.08)

(58) Field of Classification Search
CPC .... F21V 19/001; F21V 19/0055; F21V 23/06; F21Y 2107/50; F21Y 2105/10; F21Y 2105/14; F21Y 2105/16; F21Y 2103/10; F21Y 2115/10
See application file for complete search history.

(56) References Cited

U.S. PATENT DOCUMENTS 4,654,629 A * 3/1987 Bezos ..................... B61L 15/02 340/815.45
7,665,862 B2 * 2/2010 Villard ...................... F21K 9/90 362/249.02
7,780,315 B2 * 8/2010 Gasquet .................. F21V 29/70 362/294
7,918,591 B2 * 4/2011 Lynch ..................... F21V 29/75 362/240
7,944,708 B2 * 5/2011 Lin ......................... F21S 2/005 361/769
7,959,445 B1 * 6/2011 Daily ................... H01R 12/716 439/928
8,246,219 B2 * 8/2012 Teng ..................... F21V 29/763 362/311.03
9,033,547 B2 * 5/2015 Manahan .................. F21V 5/04 362/249.03
9,490,554 B2 * 11/2016 Brown ................ F21V 19/0055
(Continued)

FOREIGN PATENT DOCUMENTS

CN 102682668 A 9/2012
CN 205264273 U 5/2016
(Continued)

*Primary Examiner* — Ismael Negron
(74) *Attorney, Agent, or Firm* — Ricky Lam

(57) ABSTRACT

A display unit includes an LED panel provided on a strip-shaped section assembly; stepped mounting structures provided at each side of the strip-shaped section assembly; a plurality of lamp panel screw holes and a plurality of longitudinal connecting screw holes provided in each stepped mounting structure; and a longitudinal connecting assembly configured for connecting two adjacent display units and located in the middle of the thickness of the display units, such that angles between two adjacent display units is adjustable.

6 Claims, 7 Drawing Sheets

(56) References Cited

U.S. PATENT DOCUMENTS

| | | | | |
|---|---|---|---|---|
| 10,269,719 | B2 * | 4/2019 | Tiehan | F21K 9/20 |
| 2011/0175548 | A1 * | 7/2011 | Nishimura | H05K 1/0216 315/294 |
| 2012/0243227 | A1 * | 9/2012 | Shimizu | F21V 19/0045 362/249.01 |
| 2018/0259171 | A1 * | 9/2018 | Pharr | H05B 45/10 |

FOREIGN PATENT DOCUMENTS

| | | | |
|---|---|---|---|
| CN | 205722642 | U | 11/2016 |
| CN | 206451468 | U | 8/2017 |
| CN | 207818111 | U | 9/2018 |
| CN | 110148355 | A | 8/2019 |
| CN | 210691896 | U | 6/2020 |
| CN | 211399408 | U | 9/2020 |
| CN | 211858049 | U | 11/2020 |
| CN | 212344190 | U | 1/2021 |
| CN | 112785934 | A | 5/2021 |
| CN | 215814969 | U | 2/2022 |
| CN | 216749173 | U | 6/2022 |
| CN | 218214544 | U | 1/2023 |
| CN | 118262632 | A | 6/2024 |
| WO | WO2022165766 | A1 | 8/2022 |

* cited by examiner

LED DISPLAY UNIT WITH ANGULARLY ADJUSTABLE CONNECTING STRUCTURE

FIELD OF THE INVENTION

The present invention belongs to the technical field of floor display screens, and particularly relates to a display unit of a rolling LED floor display screen and a floor display screen.

BACKGROUND OF THE INVENTION

Currently, floors screens on the market are mainly formed by connecting a plurality of unit display modules by flexible steel meshes to achieve a bending effect. However, due to the limitations of the flexible steel meshes, this type of floor screen has the following disadvantages: for example, a rolling angle is small, the flexible steel meshes cannot be dismounted, which connect the whole display screen, the dimensions are too large, and the bending effect and curvature are not ideal, resulting in problems of short bending fatigue lifespan and increase in gaps between unit display modules when unfolding.

Moreover, because the rolling angle is too small, it is not convenient to roll it into a small cylindrical shape, making it difficult to transport and fit into an flight case.

SUMMARY OF THE INVENTION

(I) Technical Problem to be Solved

For existing technical problems, the present invention provides a display unit of a rolling LED floor display screen and a floor display screen.

(II) Technical Solution

To achieve above objective, the main technical solution adopted in the present invention is as follows:

A display unit of a rolling LED floor display screen, including:

- a strip-shaped section assembly having two sides;
- an LED lamp panel includes a main body and is arranged on one surface of the strip-shaped section assembly, and connected to the strip-shaped section assembly;
- the main body comprises a four-layer glass fiber circuit board, a plurality of openings formed in an edge of a bottom layer of a back surface of one side of the four-layer glass fiber circuit board, a neck formed in a third layer of the other side of the four-layer glass fiber circuit board, wherein the neck is configured for integrally forming and pressing in the thin steel sheet;
- stepped mounting structures provided at two sides of the strip-shaped section assembly;
- a plurality of lamp panel screw holes and a plurality of longitudinal connecting screw holes provided at each stepped mounting structure;
- a longitudinal connecting assembly configured for connecting two adjacent display units, and located in the middle of the thickness of the display units of rolling LED floor display screens, the longitudinal connecting assembly configured to enable the angles between the two adjacent display units, wherein the longitudinal connecting assembly is a thin steel sheet clamped in the main body of the LED lamp panel;
- a plurality of studs;
- a plurality of lugs arranged on one side of the thin steel sheet, the plurality of lugs correspondingly pressed in the plurality of openings, compressed and fixed by the longitudinal connecting screw holes and the studs on the stepped mounting structures, and configured for connecting the two adjacent display units;
- a power wire port and a power wire connected to the LED lamp panel through the power wire port;
- a signal line port formed in both sides of the strip-shaped section assembly, and a signal line connected to the LED lamp panel through the signal line port;
- a transverse lifting cotton belt port formed in the strip-shaped section assembly;
- a receiving card port formed in the strip-shaped section assembly;
- a receiving card correspondingly clamped in the receiving card port and in signal control connection with the LED lamp panel, the signal line connected to the receiving card and configured to transmit a control signal to the LED lamp panel assembly by the receiving card;
- a lamp panel power socket connected to a power wire which passes through the power wire port;
- a lamp panel signal socket arranged on the main body and connected to the receiving card;
- the main body is provided with a screw connector connected to the strip-shaped section assembly, and to the strip-shaped section assembly by screws; and
- a transverse lifting cotton belt cover plate arranged on the strip-shaped section assembly, and configured to cover the transverse lifting cotton belt port, and connected to the strip-shaped section assembly.

Preferably, each LED lamp panel comprises: the main body and a plurality of LED lamp beads arranged on a front surface of the main body in an array mode;

- the main body is in control connection with the LED lamp beads;
- the main body is a COB lamp panel or a surface-mounted lamp panel, a transparent adhesive tape is pressed on the surface of the COB lamp panel to protect an LED light-emitting chip, and a surface of the surface-mounted lamp panel is encapsulated by glue filling by a GOB process.

Preferably, a rear cover plate is further arranged on the strip-shaped section assembly;

- the rear cover plate is arranged on the strip-shaped section assembly, and configured to protect the receiving card;
- a through hole is formed in the strip-shaped section assembly;
- a rear cover mounting column is arranged on the main body; and
- the rear cover mounting column passes through the through hole to be connected to the rear cover plate.

Preferably, end connecting holes are formed in two ends of the strip-shaped section assembly; and

- the two ends of two strip-shaped section assemblies are configured to realize detachable connection with the longitudinal connecting plate by the end connecting holes.

Further, a floor display screen is provided by the present disclosure, which includes the display units of the rolling LED floor display screen, wherein

- every two adjacent display units are connected by the longitudinal connecting assembly;
- the plurality of display units sequentially pass through the corresponding transverse lifting cotton belt port in each display unit by the transverse lifting cotton belt in the transverse direction and then are connected together to form the display screen; and power wires and signal lines among the plurality of display units are capable of being sequentially connected in series.

Preferably, the floor display screen further comprises:

a flight case body, wherein the display screen is capable of being rolled for multiple circles to form a cylindrical body and is stored in the flight case body;

a power supply and a sending card are arranged in the flight case body;

the power supply is configured to supply power to each display unit of rolling LED floor display screen by the power wire; and the sending card is configured to send control information to each display unit of rolling LED floor display screen by the signal line.

(III) Beneficial Effects

The present has the beneficial effects that:

two adjacent display units are pulled by the thin steel sheet; after unfolding, a splicing gap in front of the display unit is very small, and the spacing between the lamp beads on the edges of the two adjacent display units are consistent, so it is suitable for the floor display screen with a tiny spacing. Each display unit can be independently disassembled, which facilitates maintenance or replacement. The thin steel sheet is arranged on the back surface of the lamp panel and is integrally molded with the lamp panel at the back, the steel sheet is pressed between glass fiber plates, the steel sheet is 0.2-0.3 mm in thickness and can be bent for multiple times. The studs for fixing the lamp panel are pressed into the steel sheet, so that the steel sheet cannot be pulled out, and the firmness is improved; the plurality of lugs are arranged on one side of the thin steel sheet and are clamped into grooves in the surface of the other side of the adjacent lamp panel; and the lugs and the grooves can be circular or inverted trapezoidal.

The longitudinal connecting cotton belt is a high-strength non-woven fabric; when unfolding, the two display units are directly tensioned after being fixed by the screws; and when the longitudinal connecting cotton belt is combined with the thin steel sheet for use, there is basically no gap between the adjacent LED lamp panels, so that the seamless splicing effect is achieved. The center of the longitudinal connecting cotton belt is a rolling center. The transverse lifting cotton belt plays a role in guaranteeing the overall flatness, and the same effect can be achieved when the transverse lifting cotton belt is replaced with the hinge. The power wire ports and the signal line ports are arranged in the two sides of the display units, so that the display units are conveniently connected in series. The detachable receiving cards are arranged in the display units, and the plurality of longitudinal connecting plates connect the longitudinal display units. The plurality of display units connected in series can be rolled by multiple circles to form the cylindrical body, which facilitates transportation and unfolding. When storing in the flight case body, the power supply and the sending card are arranged in the flight case body, and butt joint ports are formed outside the flight case body to provide power and signal for the display unit of the rolling LED floor display screen. The LED lamp panels are the COB lamp panels or the surface-mounted lamp panels; the surfaces of the surface-mounted lamp panels are packaged by glue filling by the GOB process, and it supports treading. A plurality of contact surfaces making contact with the floor are arranged on the rear portion of the section unit, and cannot be deformed after being treaded; and because the rolling design is adopted, when the floor is uneven, the floor display screen can be bent along with the floor. The display unit of the floor display screen is integrally ultrathin and ultralight; the floor display screen is thin, which facilitates rolling; each display unit of the floor display screen is connected by the adjacent longitudinal connecting cotton belt; the longitudinal connecting cotton belts or the hinges are arranged at the positions of the stepped installation structures and are located in the middle of the thickness of the display units; and when backwards rolling, the stepped shape cannot be blocked, and the rolling angles of the two adjacent display units is large.

REFERENCE NUMERALS

1: LED lamp panels; 101: lamp panel power socket; 102: lamp panel signal base; 103: rear cover mounting column; 104: four-layer glass fiber circuit board;

2: strip-shaped section assembly; 201: power wire port; 202: signal line port; 203: transverse lifting cotton belt port; 204: transverse lifting cotton belt cover plate; 205: receiving card port; 206: receiving card; 207: rear cover plate; 208: stepped mounting structure; 209: lamp panel screw hole; 2010: longitudinal connecting screw hole; 2011: longitudinal connecting plate;

3: transverse lifting cotton belt; 4: cotton belt; 5: power wire; 6: signal line; 7: thin steel sheet; 701: lug; and 8: hinge.

DETAILED DESCRIPTION OF SOME EMBODIMENTS

In order to better explain the present invention and facilitate understanding, the following detailed description of the present invention will be made in conjunction with the accompanying drawings and specific embodiments.

Figure 1:
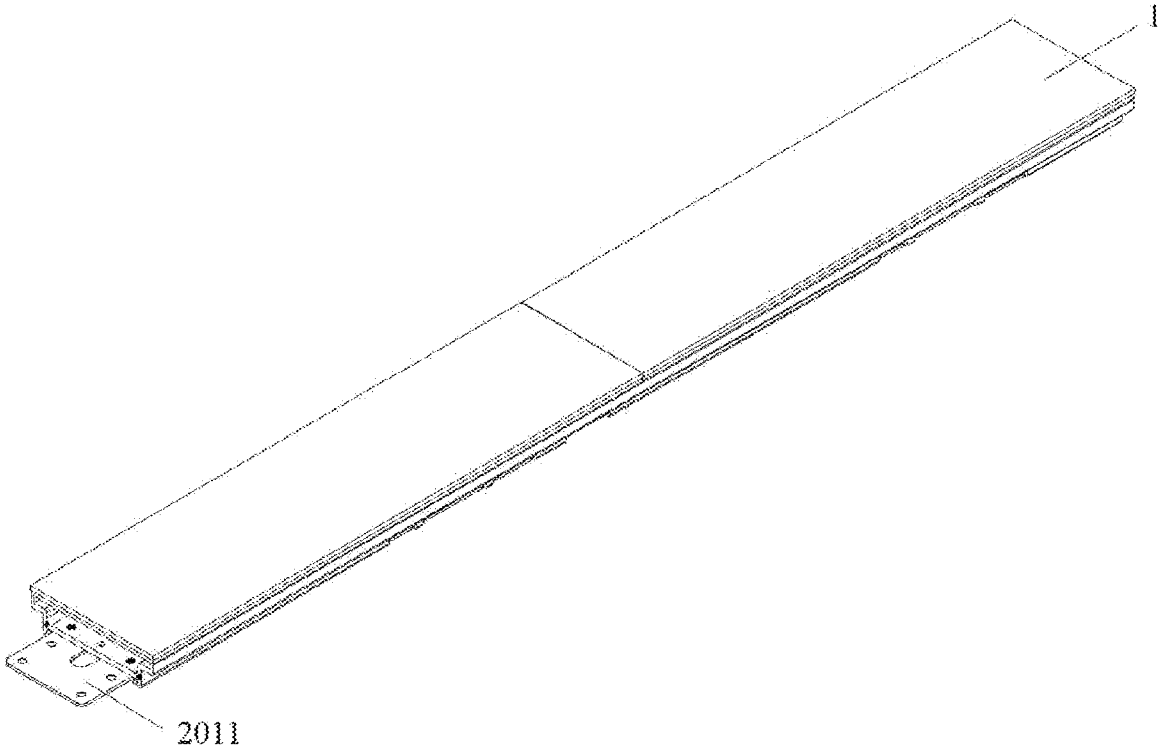
FIG. 1 is a schematic structural diagram of a display unit of a rolling LED floor display screen provided by the present invention.
Figure 2:
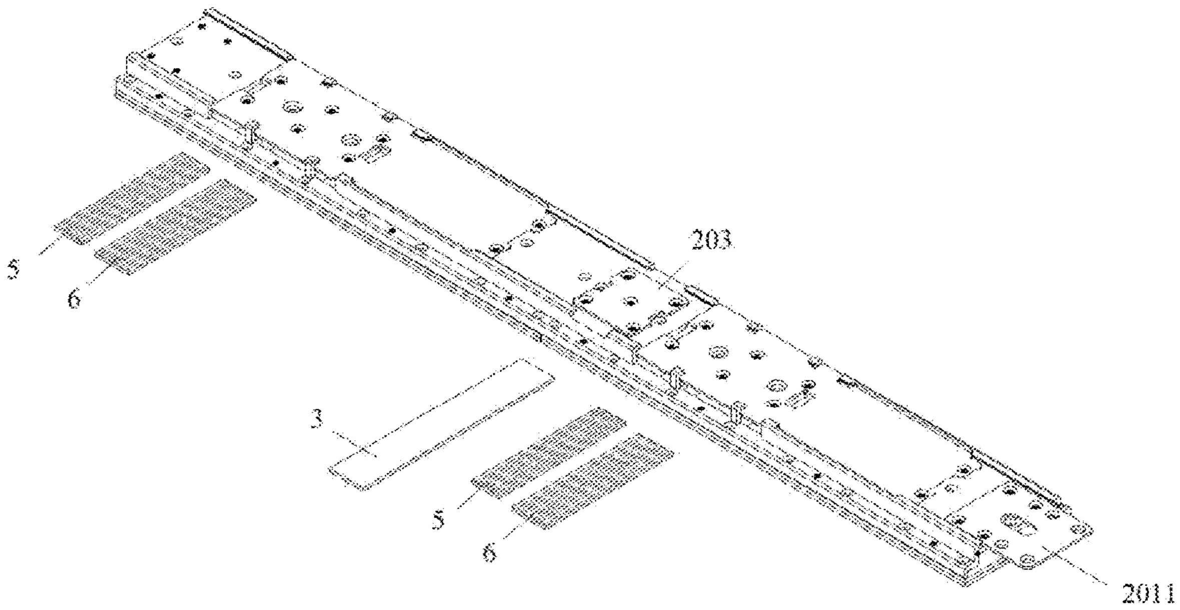
FIG. 2 is a schematic structural diagram of a display unit of a rolling LED floor display screen provided by the present invention.
Figure 3:
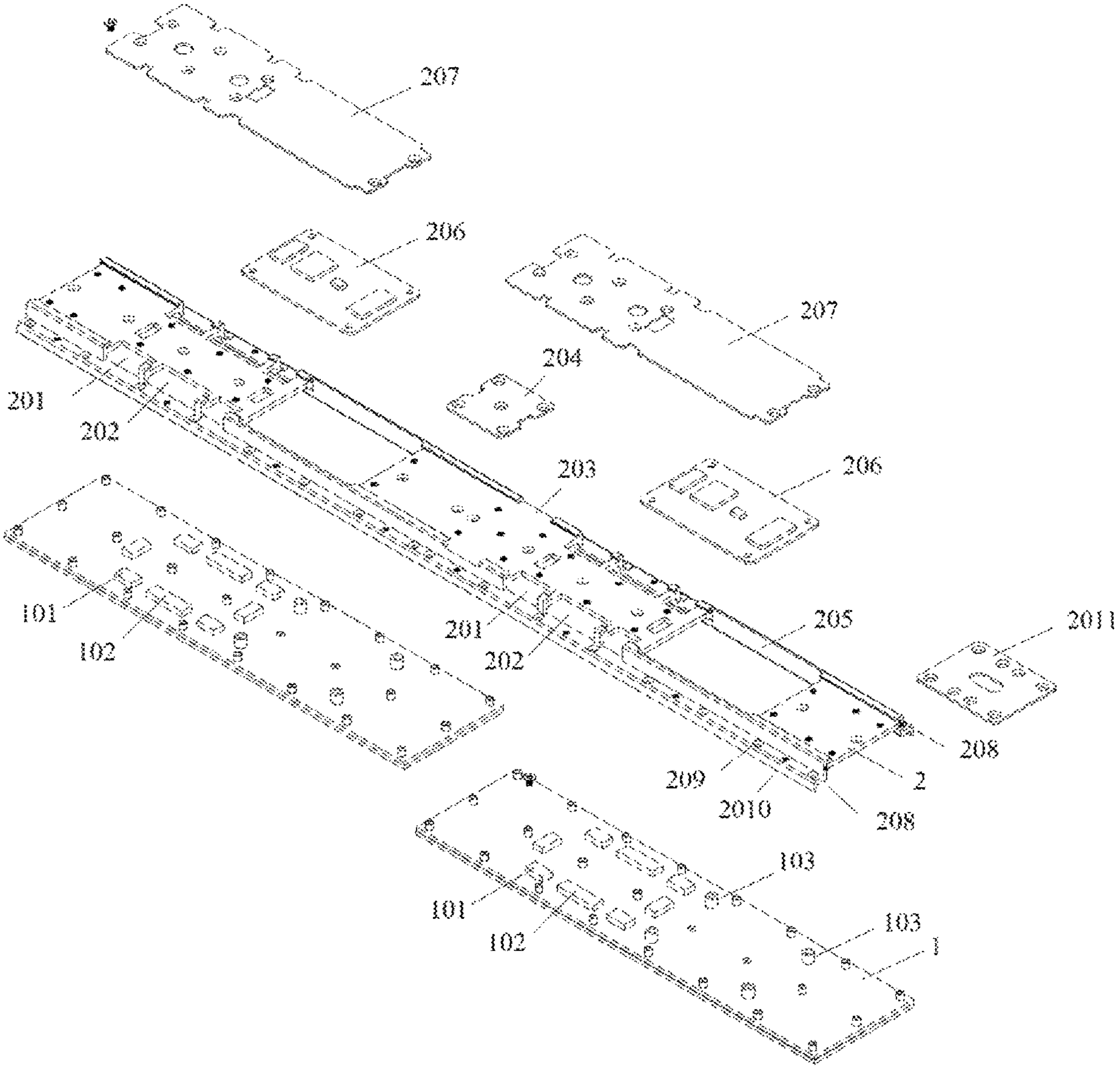
FIG. 3 is a schematic structural diagram of a display unit of a rolling LED floor display screen provided by the present invention.
Figure 4:
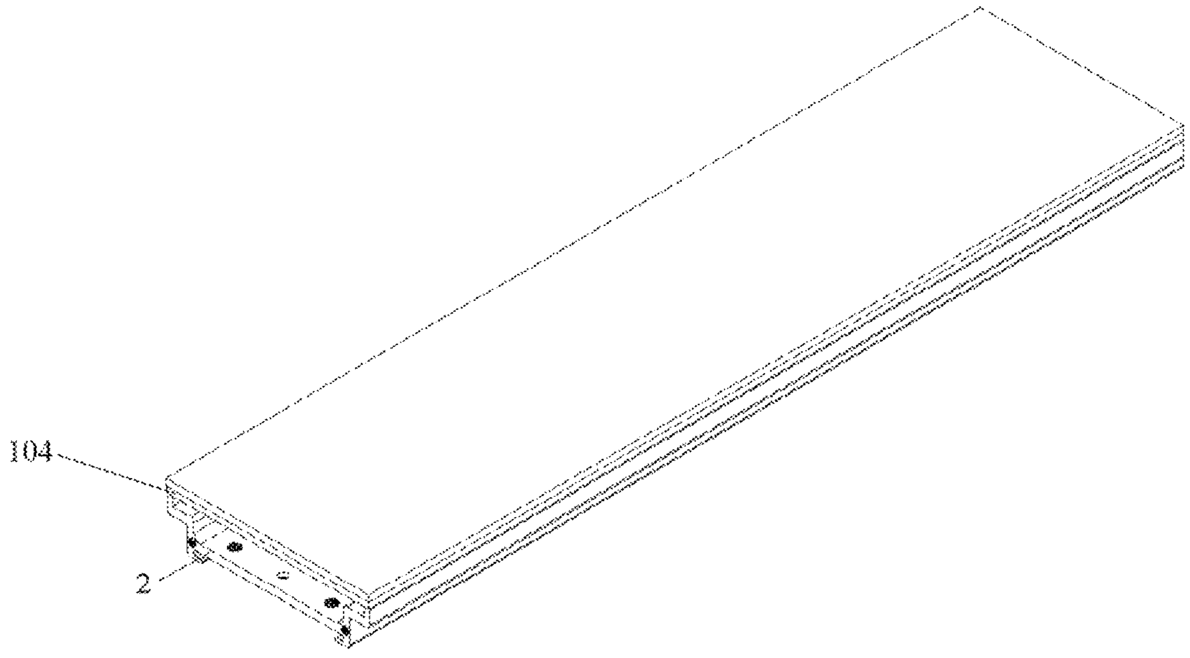
FIG. 4 is a schematic structural diagram of a four-layer glass fiber circuit board of an LED lamp panel of a display unit of a rolling LED floor display screen provided by the present invention.
Figure 5:
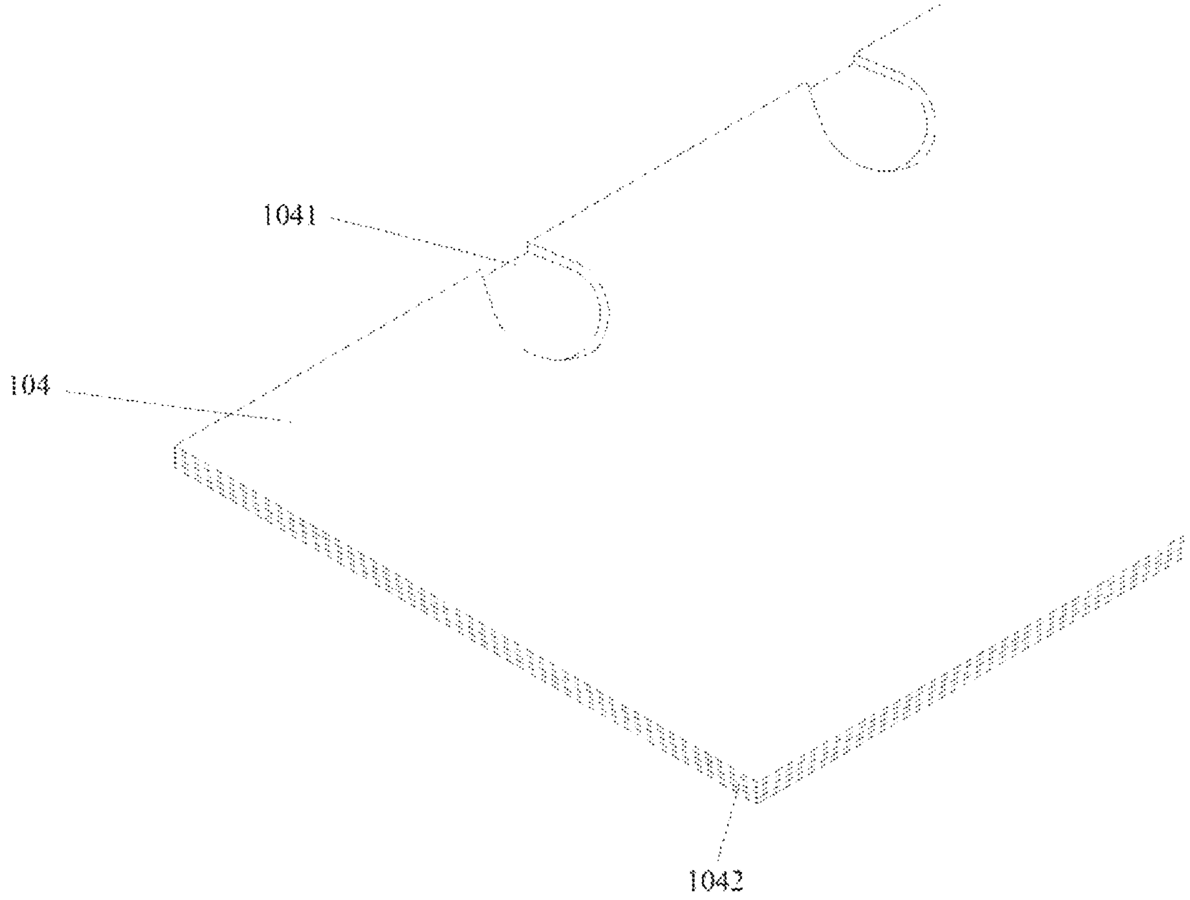
FIG. 5 is a schematic structural diagram of a four-layer glass fiber circuit board of an LED lamp panel of a display unit of a rolling LED floor display screen provided by the present invention.
Figure 6:
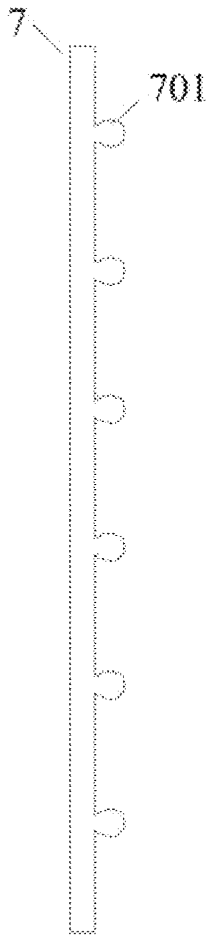
FIG. 6 is a schematic structural diagram of a thin steel sheet in a display unit of a rolling LED floor display screen provided by the present invention.
Figure 7:
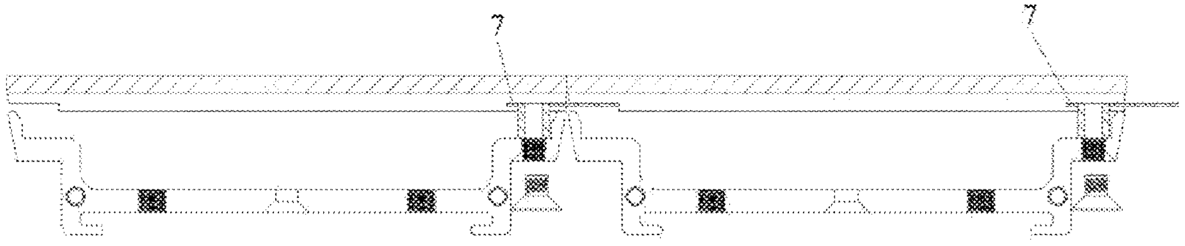
FIG. 7 is a schematic diagram of a connecting structure when a longitudinal connecting assembly between two adjacent display units of a floor display screen is a thin steel sheet according to the present invention.
Figure 8:
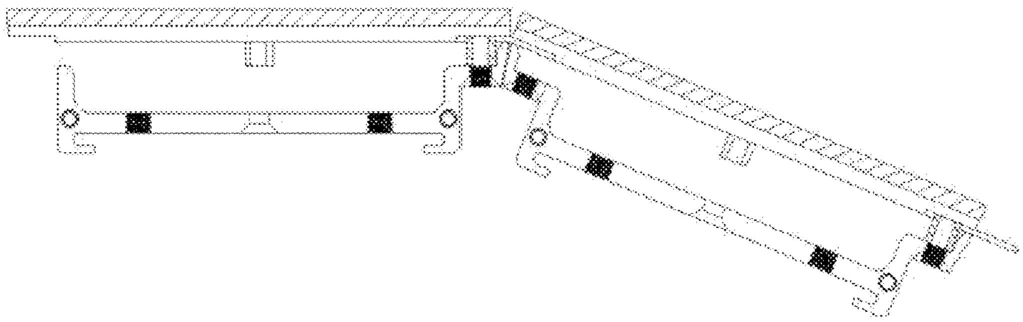
FIG. 8 is a schematic diagram of bending of a connecting structure when a longitudinal connecting assembly between two adjacent display units of a floor display screen is a thin steel sheet according to the present invention.
Figure 9:
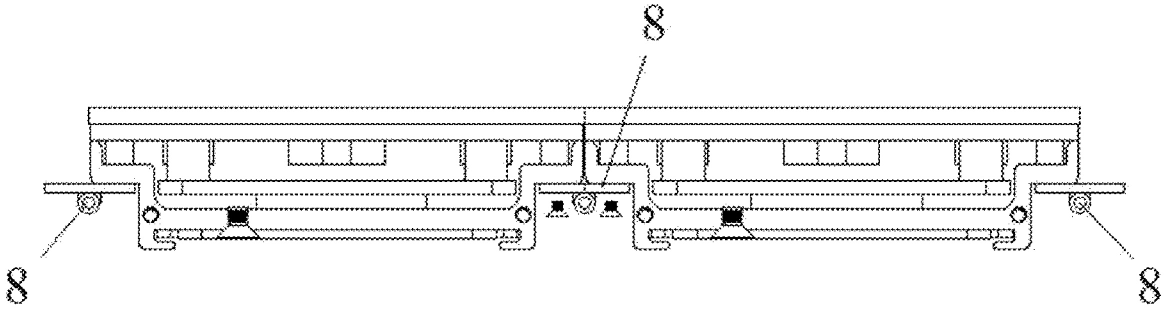
FIG. 9 is a schematic diagram of a connecting structure when a longitudinal connecting assembly between two adjacent display units of a floor display screen is a hinge according to the present invention.
Figure 10:
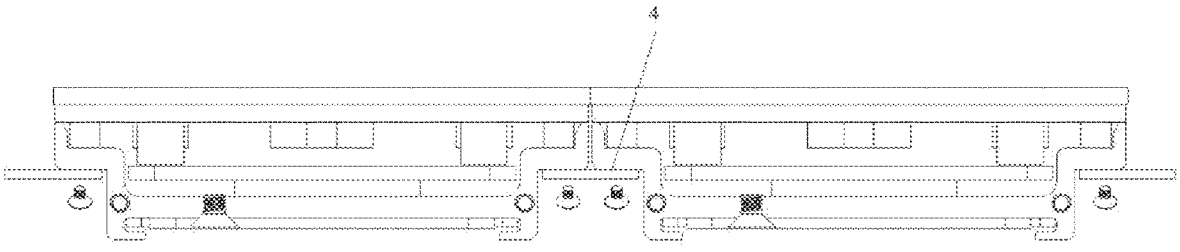
FIG. 10 is a schematic diagram of a connecting structure of a longitudinal connecting cotton belt between two adjacent display units of a floor display screen provided by the present invention.
Figure 11:
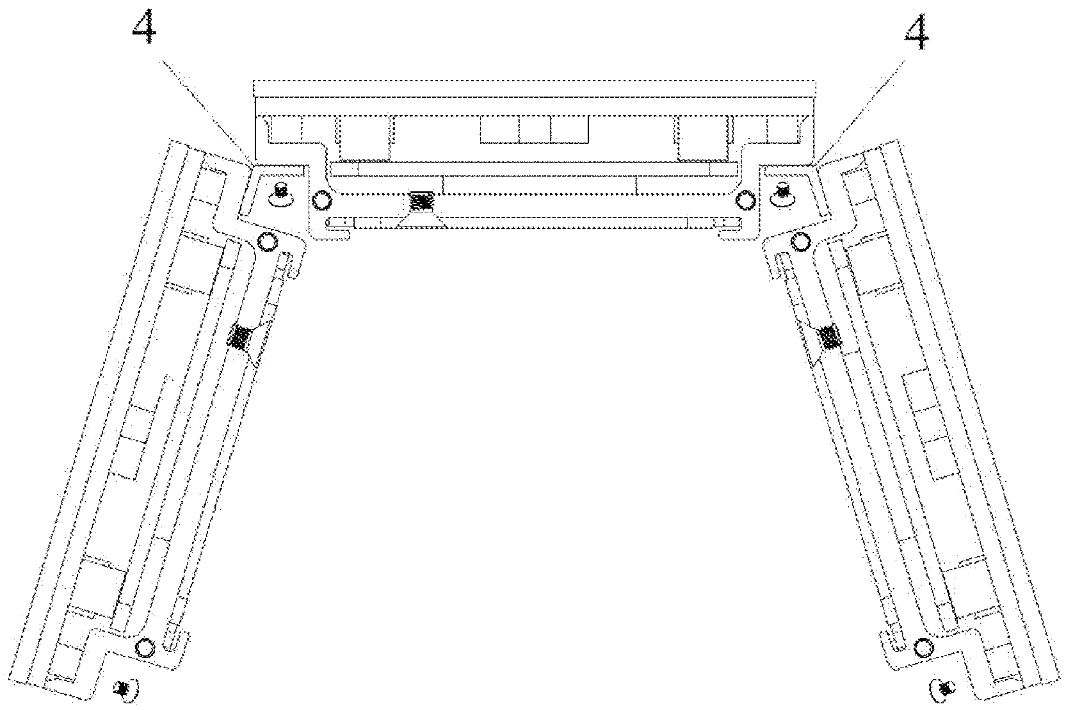
FIG. 11 is a schematic structural diagram of local bending of a floor display screen provided by the present invention.

As shown in FIG. 1 to FIG. 11, an embodiment discloses a display unit of a rolling LED floor display screen, which includes: an LED lamp panel 1 and a strip-shaped section assembly 2. The LED lamp panel 1 is arranged on one surface of the strip-shaped section assembly 2, and is connected to the strip-shaped section assembly 2; two sides of the strip-shaped section assembly 2 are both provided with a power wire port 201 and a signal line port 202; a power wire 5 can be connected to the LED lamp panel 1 through the power wire port 201; the signal line 6 can be connected to the LED lamp panel 1 through the signal line port 202; the two sides of the strip-shaped section assembly 2 are both provided with stepped mounting structures 208; each stepped mounting structure 205 is provided with a plurality of lamp panel screw holes 209 and a plurality of longitudinal connecting screw holes 2010; and a transverse lifting cotton belt port 203 is also formed in the strip-shaped section assembly 2.

In practical application, a longitudinal connecting assembly for connecting two adjacent display units of the rolling LED floor display screen can be arranged at the position of each stepped mounting structure 208 and is positioned in the middle of the thickness of the display units of the rolling LED floor display screen, so that the rolling angles of the two adjacent display units are increased.

When the longitudinal connecting assembly is a thin steel sheet 7, it is clamped in a main body of the LED lamp panel; the main body at least includes a four-layer glass fiber circuit board 104; a plurality of openings 1041 are formed in an edge of a bottom layer of a back surface of one side of the four-layer glass fiber circuit board 104; a neck 1042 is reserved in a third layer of the other side of the four-layer glass fiber circuit board 104 and is used for integrally molded and pressing in the thin steel sheet 7; a plurality of lugs 701 are arranged on one side of the thin steel sheet 7; the plurality of lugs 701 can be correspondingly pressed in the plurality of openings 1041 respectively, are compressed and fixed by the longitudinal connecting screw holes and studs on the stepped mounting structures and are used for connecting two adjacent display units of the rolling LED floor display screen; when the longitudinal connecting assembly is a cotton belt or a hinge 8, it is arranged at the position of each stepped mounting structure and is fixed by the corresponding longitudinal connecting screw holes and a screw on each stepped mounting structure and is used for connecting two adjacent display units of the rolling LED floor display screen.

Specifically, the display unit of the rolling LED floor display screen further includes: a receiving card 206; a receiving card port 205 matched with the receiving card 206 is further formed in the strip-shaped section assembly 2; the receiving card 206 is correspondingly clamped in the receiving card port 205 and is in signal control connection with the LED lamp panel 1; the signal line 6 is connected to the receiving card 206 and can be used for sending a control signal to the LED lamp panel 1 by the receiving card 206.

In the embodiment, at least two LED lamp panels 1 can be sequentially arranged on the strip-shaped section assembly 2 in a connection manner; each LED lamp panel 1 is correspondingly provided with the power wire port 201, the signal line port 202, the plurality of lamp panel screw holes 209, the plurality of longitudinal connecting card screw holes 2010, the receiving card port 205 and the transverse lifting cotton belt port 203 on the strip-shaped section assembly 2.

Specifically, each LED lamp panel 1 includes: a main body and a plurality of LED lamp beads arranged on the front surface of the main body in an array mode; the main body is in control connection with the LED lamp beads; the lamp panel body is a COB lamp panel or a surface-mounted lamp panel, a transparent adhesive tape is pressed on the surface of the COB lamp panel to protect an LED light-emitting chip, and the surface of the surface-mounted lamp panel is encapsulated by glue filling by a GOB process.

In the embodiment, the main body is provided with a lamp panel power socket 101 and a lamp panel signal socket 102; the lamp panel power socket 101 can be connected to the power wire 5 which passes through the power wire port 201; and the lamp panel signal socket 102 can be connected to the receiving card 206.

The main body is further provided with a screw connector connected to the strip-shaped section assembly 2 and is connected to the strip-shaped section assembly 2 by the screws; the strip-shaped section assembly 2 is further provided with a transverse lifting cotton belt cover plate 204; and the transverse lifting cotton belt cover plate 204 can cover the transverse lifting cotton belt port 203 and is connected to the strip-shaped section assembly 2.

In the embodiment, the strip-shaped section assembly 2 is further provided with a rear cover plate 207; the rear cover plate 207 is arranged on the strip-shaped section assembly 2 and can protect the receiving card 206; the strip-shaped section assembly 2 is provided with a through hole; the main body is provided with a rear cover mounting column 103; and the rear cover mounting column 103 can pass through the through hole to be connected to the rear cover plate 207.

End connecting holes are formed in two ends of the strip-shaped section assembly 2; and the two ends of the two strip-shaped profile assemblies 2 can be detachably connected to the end connecting holes and the longitudinal connecting plate 2011.

Figure 12:
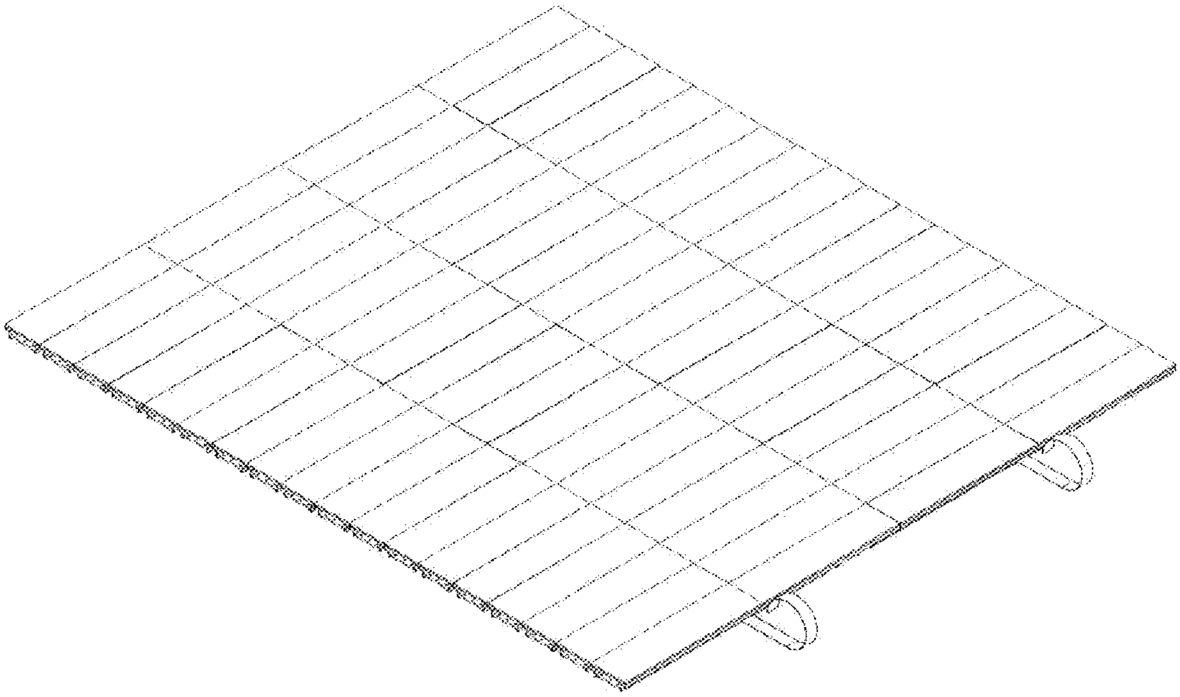
FIG. 12 is a schematic diagram of a front structure of a floor display screen provided by the present invention.
Figure 13:
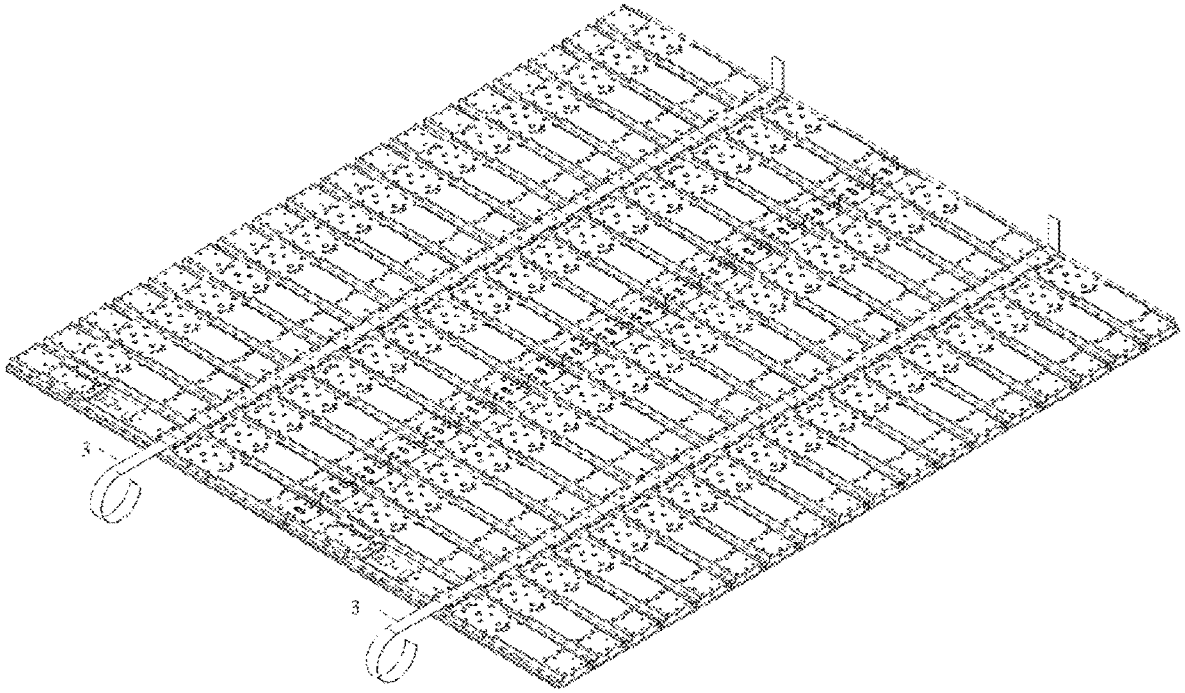
FIG. 13 is a schematic diagram of a back structure of a floor display screen provided by the present invention.

As shown in FIG. 10 to FIG. 13, an embodiment also provides a floor display screen which includes a plurality of display units of rolling LED floor display screen;

every two adjacent display units of the rolling LED floor display screen are connected by the longitudinal connecting cotton belt 4; the plurality of display units of the rolling LED floor display screen sequentially pass through the corresponding transverse lifting cotton belt ports 203 on each display unit of the rolling LED floor display screen in the transverse direction by the transverse lifting cotton belt 3 and are connected together to form the display screen; and the power wires 5 and the signal lines 6 among the plurality of display units of the rolling LED floor display screen can be sequentially connected in series.

The floor display screen also includes: an flight case body; the display screen can be rolled for multiple circles to form a cylindrical body and is stored in the flight case body; a power supply and a sending card are arranged in the flight case body; the power supply can supply power to each display unit of the rolling LED floor display screen by the power wire 5; and the sending card can send control information to each display unit of the rolling LED floor display screen by the signal line 6.

Specifically, the flight case body is arranged, the power supply and the sending card are configured in the flight case body and are connected to a first floor display unit, and other units are transversely connected in series. When used as the floor display screen, it is spread from the outermost end.

The floor display screen provided by the embodiment has the following characteristics:

1, the longitudinal connecting cotton belt 4 is a high-strength non-woven fabric; when unfolding, the two display units are directly tensioned after being fixed by the screws, and there is basically no gap among the LED lamp panels.

2, the center of the longitudinal connecting cotton belt 4 is a rotating center.

3, the transverse lifting cotton belt 3 plays a rolling effect and an integral flatness guaranteeing effect.

4, the power wire port and the signal line port are arranged in two sides of the display units, so that the display units are conveniently connected in series.

5, the detachable receiving card is arranged in the display unit, and a plurality of longitudinal connecting plates are connected to the longitudinal display unit.

6, the display screen can be rolled into multiple circles to form a cylinder, which facilitates transportation and unfolding.

7, the power supplies and the sending card are arranged in the flight case body.

8, the whole display unit is ultrathin and ultralight.

9, the LED lamp panel is a COB lamp panel or a surface-mounted lamp panel, the surface is encapsulated by glue filling by the GOB process, so it supports treading.

10, a plurality of contact surfaces making contact with the floor are arranged on the rear portion of the section unit, and cannot be deformed after being treaded; and because the rolling design is adopted, when the floor is uneven, the floor display screen can be bent along with the floor.

The above combines specific embodiments to describe the technical principles of the present invention. These descriptions are only for the purpose of explaining the principles of the present invention and should not be interpreted in any way as a limitation on the scope of protection of the present invention. Based on the explanations here, those skilled in the art can conjure up other specific embodiments of the present invention without requiring inventive labor, and these embodiments will fall within the scope of protection of the present invention.

What is claimed is:

1. A display unit of a rolling LED floor display screen, comprising:

a strip-shaped section assembly having two sides;

an LED lamp panel includes a main body and is arranged on one surface of the strip-shaped section assembly, and connected to the strip-shaped section assembly;

the main body comprises a four-layer glass fiber circuit board, a plurality of openings formed in an edge of the bottom layer of the back surface of one side of the four-layer glass fiber circuit board, a neck formed in the third layer of the other side of the four-layer glass fiber circuit board;

stepped mounting structures provided at the two sides of the strip-shaped section assembly;

a plurality of lamp panel screw holes and a plurality of longitudinal connecting screw holes provided at each stepped mounting structure;

a longitudinal connecting assembly configured for connecting two adjacent display units, and located in the middle of the thickness of the display units of rolling LED floor display screens, the longitudinal connecting assembly configured to enable the angles between the two adjacent display units, wherein the longitudinal connecting assembly is a thin steel sheet clamped in the main body of the LED lamp panel, with the neck configured for integrally forming and pressing in the thin steel sheet;

a plurality of studs;

a plurality of lugs arranged on one side of the thin steel sheet, the plurality of lugs correspondingly pressed in the plurality of openings, compressed and fixed by the longitudinal connecting screw holes and the studs on the stepped mounting structures, and configured for connecting two adjacent display units;

a power wire port and a power wire connected to the LED lamp panel through the power wire port;

a signal line port formed in both sides of the strip-shaped section assembly, and a signal line connected to the LED lamp panel through the signal line port;

a transverse lifting cotton belt port formed in the strip-shaped section assembly;

a receiving card port formed in the strip-shaped section assembly;

a receiving card correspondingly clamped in the receiving card port and in signal control connection with the LED lamp panel, the signal line connected to the receiving card and configured to transmit a control signal to the LED lamp panel assembly by the receiving card;

a lamp panel power socket connected to a power wire which passes through the power wire port;

a lamp panel signal socket arranged on the main body and connected to the receiving card;

the main body is provided with a screw connector connected to the strip-shaped section assembly, and to the strip-shaped section assembly by screws; and a transverse lifting cotton belt cover plate arranged on the strip-shaped section assembly, and configured to cover the transverse lifting cotton belt port, and connected to the strip-shaped section assembly.

2. The display unit according to claim 1, wherein each LED lamp panel comprises: the main body and a plurality of LED lamp beads arranged on a front surface of the main body in an array mode;

the main body is in control connection with the LED lamp beads;

the main body is a COB lamp panel or a surface-mounted lamp panel, a transparent adhesive tape is pressed on the surface of the COB lamp panel to protect an LED light-emitting chip, and a surface of the surface-mounted lamp panel is encapsulated by glue filling by a GOB process.

3. The display unit according to claim 1, wherein a rear cover plate is further arranged on the strip-shaped section assembly;

the rear cover plate is arranged on the strip-shaped section assembly, and configured to protect the receiving card;

a through hole is formed in the strip-shaped section assembly;

a rear cover mounting column is arranged on the main body; and the rear cover mounting column passes through the through hole to be connected to the rear cover plate.

4. The display unit according to claim 3, wherein end connecting holes are formed in two ends of the strip-shaped section assembly; and the two ends of two strip-shaped section assemblies are configured to realize detachable connection with the longitudinal connecting plate by the end connecting holes.

5. A floor display screen, comprising the display units of the rolling LED floor display screen according to claim 1, wherein every two adjacent display units are connected by the longitudinal connecting assembly;

the plurality of display units sequentially pass through the corresponding transverse lifting cotton belt port in each display unit by the transverse lifting cotton belt in the transverse direction and then are connected together to form the display screen; and power wires and signal lines among the plurality of display units are capable of being sequentially connected in series.

6. The floor display screen according to claim 5, further comprising:

a flight case body, wherein the display screen is capable of being rolled for multiple circles to form a cylindrical body and is stored in the flight case body;

a power supply and a sending card are arranged in the flight case body;

the power supply is configured to supply power to each display unit of rolling LED floor display screen by the power wire; and the sending card is configured to send control information to each display unit of rolling LED floor display screen by the signal line.

* * * * *